June 20, 1967 G. BONNET 3,327,103

DEVICE INCLUDING A LOGICAL MULTIPLICATION MATRIX FOR CALCULATING CORRELATION FUNCTIONS

Filed July 29, 1963 3 Sheets-Sheet 1

BY

INVENTOR
GEORGES BONNET
BY Fritz G. Hochwald
AGT

June 20, 1967 G. BONNET 3,327,103

DEVICE INCLUDING A LOGICAL MULTIPLICATION MATRIX FOR CALCULATING CORRELATION FUNCTIONS

Filed July 29, 1963 3 Sheets-Sheet 3

INVENTOR
GEORGES BONNET

BY [signature]

AGT

United States Patent Office 3,327,103

Patented June 20, 1967

3,327,103

DEVICE INCLUDING A LOGICAL MULTIPLICATION MATRIX FOR CALCULATING CORRELATION FUNCTIONS

Georges Bonnet, Grenoble, Isere, France, assignor to Commissariat à l'Energie Atomique, Paris, France, an organization of France Filed July 29, 1963, Ser. No. 298,291
Claims priority, application France, July 30, 1962, 905,452
2 Claims. (Cl. 235—181)

The present invention relates to devices for the automatic calculation of correlation functions and in particular to devices for treating two electrical signals the variations of amplitude of which as a function of time represent either two functions the cross-correlation function of which is to be calculated or a single function with a time lag, when it is desired to determine the auto-correlation function.

It should be reminded that, $X(t)$ and $Y(t)$ being two random functions of an independent variable $t$ (which may be time for instance) representing two electrical signals:

The cross-correlation function $C_i(h)$ is the expectation of the product $X(t) \cdot Y(t-h)$ that is to say $$C_i(h)=E[X(t) \cdot Y(t-h)]$$

and the auto-correlation function $C_a(h)$ is the expectation of the product $X(t) \cdot Y(t-h)$ that is to say $$C_a(h)=E[X(t) \cdot X(t-h)]$$

E being the symbol representing a time lag which may be zero in the case of a cross-correlation function.

It is also possible to express these two correlation functions by the limits, when T tends toward infinity, of the following terms $$\frac{1}{2T}\int_{-T}^{+T} X(t) \cdot Y(t-h)\,dt, \text{ for } C_i(h)$$

$$\frac{1}{2T}\int_{-T}^{+T} X(t) \cdot X(t-h)\,dt, \text{ for } C_a(h)$$

(hypothesis of ergodicity)

The interest of correlation functions is first due to the fact that they permit of discovering hidden dependencies between some physical or biological phenomenons, which makes the methods and devices for calculating these functions very useful in pure and applied research, in particular in the field of measurement.

Use is also made of he cross-correlation function between the input signals and the output signals of an electric or electronic system for determining the pulse response of the system.

Finally, among other applications of the calculation of correlation functions, there is also their use for the directional detection of the useful (electro-magnetic or electro acoustic) signals and their use in general in communication or automatic control systems, which use is based upon the fundamental property of correlation functions which permits of passing from the field or domain of a real variable (such as time) to the field or domain of an imaginary variable (such as frequency or angular frequency, to wit the fact that, under some conditions, the auto-correlation functions and the density functions of the energetic spectrum (therefore of the spectrum of frequencies or angular frequencies are Fourier transforms from one another multiplied by a constant factor.

When it is desired automatically to calculate correlation functions very quickly, it is very difficult, if not impossible, instantaneously to effect the analog multiplication of the two factors under the symbol of expectation or integration, then the analog integration of the successive products, in particular in the case where signals of high frequency are treated.

This is why two methods have been suggested for the quick approximate calculation of correlation functions, to wit:

The polarity coincidence method according to which the crests of the signals are cut off and account is taken only of the sign (or polarity) of the signals without taking their amplitude into account; this is a very rough method for determining correlation functions, which does not permit an accurate calculation and which leads to important errors in directional detection problems;

The quantization method, which preserves the order of magnitude of the signals in addition to their sign (or polarity); this method is not so rough as that above mentioned and permits quicker determinations than the accurate analog circulation method; however, in many cases its accuracy and its rapidity are not sufficient.

This is why the present invention has more especially for its object improvements in devices for the automatic calculation of correlation functions, making use of the analog random function or signal quantization method.

The chief object of the present invention is to provide devices for the automatic calculation of correlation functions making use of the quantization method which comply better than up to this time with the various requirements of practice, in particular concerning the limitation of the number of quantization intervals for a given accuracy, the possibility of processing signals having greater variations, and the quickness and facility of calculation.

It consists, according to a main feature of the invention, in performing quantization not in bands of constant and equal widths as this was done to this time, but in bands the widths of which are proportional to the root mean square deviation of the processed signals, at least within a wide range of the values of said root mean deviation.

Preferably, use is made of quantization bands such that the limit between two given successive bands is equal to the mean value of the signals to be processed and in particular is equal to zero in the case of centered signals (having a mean value equal to zero). In other words, use is made of a non centered quantization (the centering of the quantization should ont be confused with the centering of the random signals or variables).

Preferred embodiments of the present invention will be hereinafter described with reference to the appended drawings, given merely by way of example, and in which.

Figures 1, 2, 3:
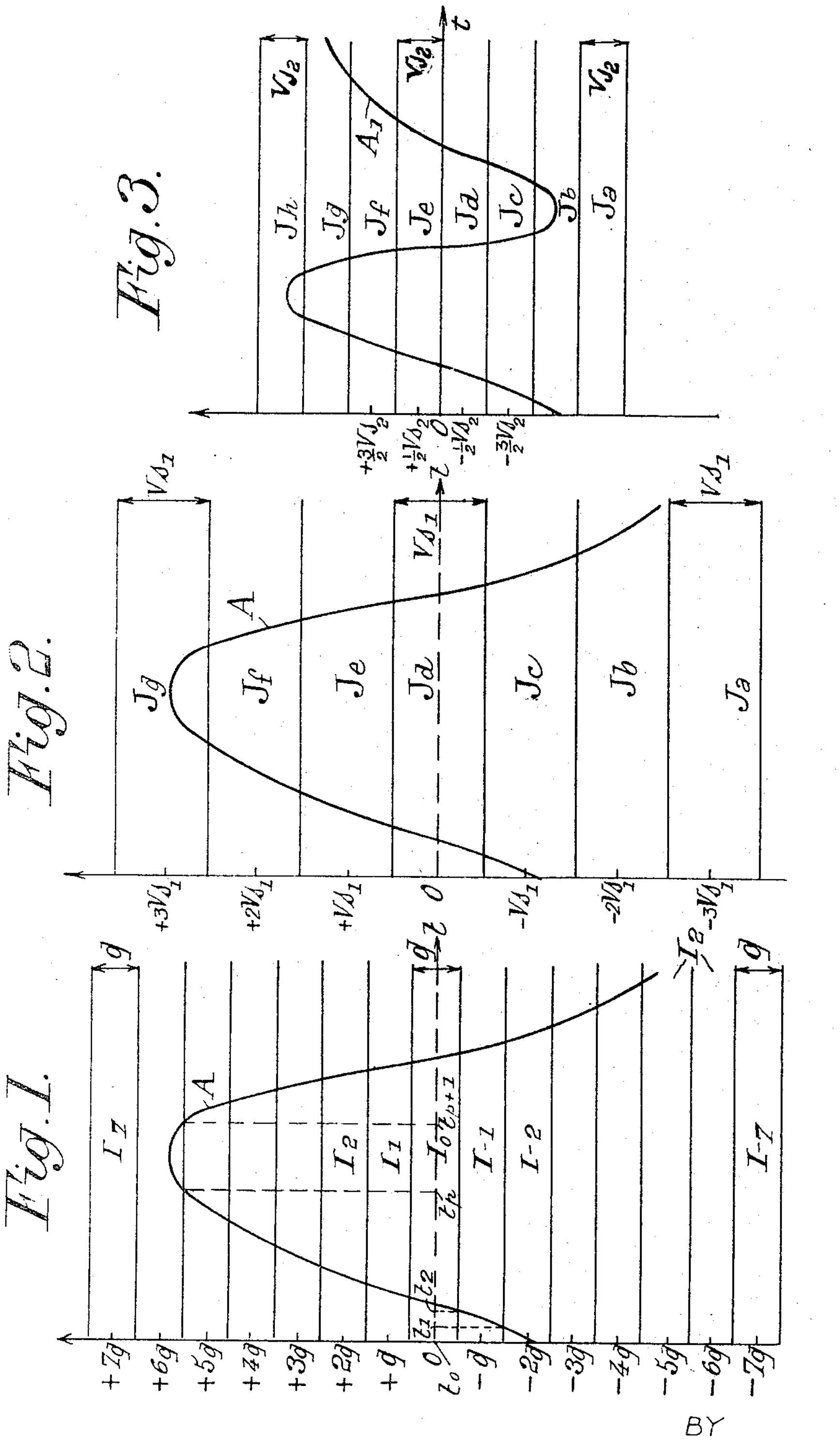
FIG. 1 illustrates the known method of quantization with bands of constant and equal widths.
FIGS. 2 and 3 illustrate the application of the invention with bands of a width proportional to the root mean square deviation on the signal that are to be processed, respectively in the case of a centered quantization and in that of a non centered quantization.

Referring first to FIG. 1 the characteristics of correlation by the quantization method which must be known to understand the invention will first be stated.

Let $X(t)$ be a stationary random function (that is to say a function the statistical properties of which do not vary for any translatory displacement of the axis of times $t$ along itself), this function being centered (that is to say having a mean value or an expectation equal to zero). If the whole of the possible values of $X(t)$ is divided into an infinite set of successive bands or intervals $I_n$ of a width equal to $q$ surrounding the points of ordinates $x=nq$ ($n$ being an algebraic integer ranging from $-\infty$ to $+\infty$), the operation of "infinite periodical quantization" consists in substituting for the random variable X the discrete variable $\hat{X}=nq$ when X is in the band $I_n$. A study of the statistical mean values of the quantized random variable $\hat{X}$ (made in particular by W. R. Bennet in the "Bell System Technical Journal" 27 (1948), pages 446–472 and by B. Widrow in "The Transactions of the Institute of Radio Engineers" CT–3, 4, (1956), pages 266–276) shows that the mean values of the second order—variance $\hat{S}^2$ and correlation function $\hat{C}(h)$—of the signal thus quantized differ very little from the corresponding mean values—variance $s^2$ and correlation function $C(h)$ (which is a function of the single variable $h$ in the case of a stationary random function) from the original signal (i.e. the signal before quantization) if the ratio $s/q$ is greater than 1. As a matter of fact $$\hat{s}^2=s^2\left(1+\frac{1}{12}\cdot\frac{q^2}{s^2}\right)$$

$$\hat{C}(h)=(1+a)\cdot C(h)+DC(h)$$

the corrective terms $a$ and $DC(h)$ being of the order of magnitude of $$e-\frac{2\pi s^2}{q^2}$$

It will therefore be seen that the ratio $v=s/q$ constitutes a quality factor for a quantization, which is the better as $v$ is greater.

On the other hand, the theory of probability shows that the excursion of a random signal about its mean or central value (which is zero in the case of a signal represented by a centered random function) is practically limited to $u.s$, $u$ being a small number (thus 99% of the values of $X(t)$ differ by less than $2.326s$ from the central value in the case of a normal distribution, also called Gauss-Laplace distribution). Advantage may be taken from this statistical law to limit the number of bands $I_n$ that are used and to perform a "limited periodical quantization" by bringing into play only a reduced number N of bands on either side of the axis of abscissas, the total width of which is substantially equal to $u.s$ ($u$ being for instance equal to a number ranging from 3 to 6).

In this case (FIG. 1) the exact value of $X(t)$ represented by curve A is replaced by $-2q$ for $t_0 \leqslant t < t_1$, by $-q$ for $t_1 \leqslant t < t_2$ . . . , by $6q$ for $t_p \leqslant t < t_{p+1}$ . . . , the exceptional values above band $I_7$ or below band $I_{-7}$ being eliminated or considered as belonging to bands $I_7$ or $I_{-7}$.

The results obtained when calculating the correlation functions by the limited periodical quantization method bringing into play in the known manner N bands (on either side of the axis of abscissas) of a width equal to $q$, always the same whatever be the signals that are being processed and constant (case of FIG. 1), depend upon ratio $v$ and upon N. If the signals that are processed are not stationary and if the root mean square deviation $s$ varies within wide limits, two kinds of difficulties are met with when applying this known method:

(1) for signals having a high root mean square deviation ($s > N.q$), the probability of their presence in the central bands becomes small and the method tends toward the polarity coincidence method, with all the drawbacks inherent in this last method;

(2) for signals having a very small root mean square deviation $s$ ($s \leqslant q$), the signal will practically always have a value within the band corresponding to the central value ($I_0$ for the centered signals) and the output of the calculation device will remain nearly always constant (zero for centered signals) so that it is impossible to make use of this method in the case of a centered quantization and of small signals.

The improvements according to the present invention permit of obviating the above mentioned drawbacks. As a matter of fact, as illustrated by FIG. 2 which reproduces the curve A corresponding to a mean quadratic deviation $s_1$, and by FIG. 3, with a curve $A_1$ corresponding to a mean quadratic deviation $s_2$ smaller than $s_1$, use is made, according to the invention, not of quantization bands of constant width, but of bands with the width of which is proportional to the root mean square deviation $s$ of the signals that are being processed, at lerast within a wide range of the values of said root mean square deviation. Therefore, the thresholds and the discrete values of the quantization are themselves proportional to this deviation.

Thus a reduced number of bands $Ja$, $Jb$, $Jc$, $Jd$, $Je$, $Jf$, $Jg$, and $Jh$ is obtained, the width of said bands being proportional to $s$.

Furthermore, for reasons which will be hereinafter stated, in particular in order to extend the range of operation to signals having a low value of $s$, one of the threshold or limits of quantization has a value equal to zero. This is the case of the quantization according to FIG. 3 where the limit between bands $Jd$ and $Je$ has an ordinate to zero. If the signals are not centered, the same results are obtained as when one of the limits is equal to the mean value of the signals.

It will be easily found that, when using bands of a width $q$ proportional to the mean quadratic deviation $s$ ($q=Vs$, with $V=$a constant), the quality factor $$V=\frac{s}{q}=\frac{s}{Vs}=\frac{1}{V}=\text{a constant}$$

Consequently, as long as $q$ and $s$ may be made proportional to each other, the quality factor V remains constant. Now it is possible to ensure this proportionality within a wide range of values of $s$. It is only for high values of $s$ that saturation phenomenons will begin to act in the electronic units. When saturation appears, quantization ceases to be fully adapted to the exact level of $s$, and the quantization units (which will be hereinafter described) tend in an asymptotic manner to work as peak limiters for the high values of $s$.

Figure 4:
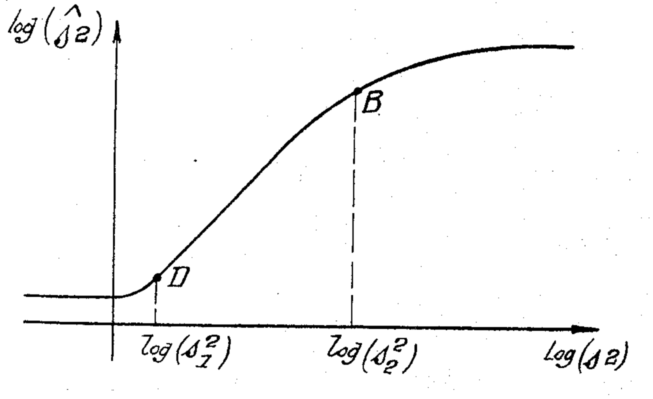
FIG. 4 shows, in logarithmic coordinates, the curve indicating the variation of the variance of a quantized signal as a function of the variance of the original signal (before quantization)

In order to explain the different quantization modes when $s$ varies, reference is made, to FIG. 4, in logarithmic coordinates, where the abscissas represent the variance $s^2$ of the initial (i.e. quantized) signal and the ordinates represent the variance $\hat{s}^2$ of the quantized signal when the improvements according to the invention are applied, in particular according to FIG. 3. It will be noted that the curve $(\hat{s}^2)=f\,[\log (s)^2]$: comprises three portions, one of which DB, of substantially rectilinear shape, corresponds to the range of values of $s$ from $s_1$, corresponding to point D, to $s_2$ corresponding to point B, for which are obtained either satisfactory measurements or a correct directivity effect (in the case where calculation of the correlation functions serves to perform directional detections). For weak signals ($s < s_1$), a correlator bringing into play said improvements behaves like a polarity coincidence correlator, but with satisfactory operation conditions. As a matter of fact it may be demonstrated (see in particular B. Picinbono in Comptes Rendus de l'Académie des Sciences 250, 12 (1960), pages 2179–2181) that a polarity coincidence correlator gives satisfactory result when the signal to noise ratio is lower than one, which condition is complied in accordance with the invention (with a limit equal to zero between two successive bands) by adjusting the correlator so that the minimum level of the noise superimposed on the signal to be processed corresponds substantially to point A, that is to say so that $s \approx q/3$ (the width of the central band or of the first bands of the same width of the quantization is substantially equal to three times the root means square deviation of the ground noise superimposed on the signal to be processed). On the contrary, beyond point B, the saturation phenomenons begin to occur and the quality factor $s$ decreases gradually.

If the field or domain, within which function $q=f(s)$ is linear (straight line DB), is limited by values $s_1$ and $s_2$, it can easily be demonstrated that a quantization according to the invention with $N_0$ bands of a width proportional to $s$ has the same dynamic effect as a quantization of the usual type (with bands of constant width) bringing into play $$N_1=\frac{s_2}{s_1}\cdot N_0 \text{ bands}$$

In view of the fact that actual technology allows to have $s_2$ equal to $100s_1$, it is possible to obtain a quantization having an excellent dynamic effect by making use of only a very small number of quantization bands of widths proportional to $s$. The reduction of the number of bands greatly simplifies the practical construction of the quantization and multiplication units of a correlator making use of such a quantization.

Figures 6, 7:
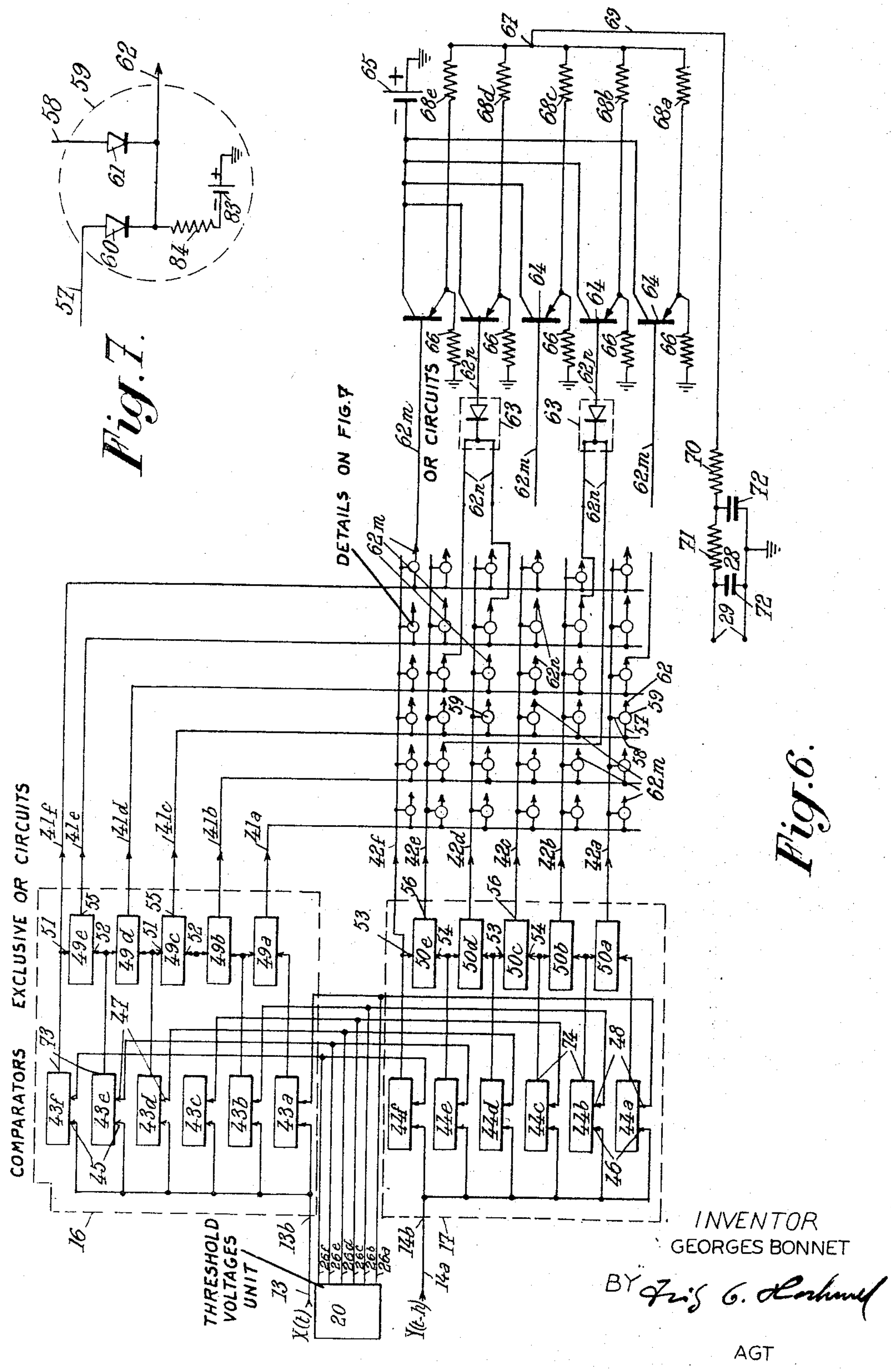
FIG. 6 illustrates in a more detailed fashion a portion of the device of FIG. 5, to wit the quantization, multiplication and integration units.
FIG. 7 shows the mounting of each of the nodes of the matrix of the multiplication unit illustrated by FIG. 6.

There will be described with reference to FIGS. 5 to 7 a preferred embodiment of a correlator, or automatic device for calculating correlation function, made according to the present invention.

It will be supposed that the random signal $X(t)$ to be treated can be represented by a centered random function complying with a law of the type of the Laplace law $$f(X)=\frac{1}{2\pi s}\cdot e^{-\frac{X^2}{2s^2}}$$

For such a signal, it suffices to perform a linear detection thereof followed by a filtering to obtain a value proportional to the absolute deviation $$s\sqrt{\frac{2}{\pi}}$$

therefore proportional to $s$.

The signal $X(t)$ is applied across the input terminals 11 and 12 of the correlator, which comprises (FIG. 5):

Two input channels 13 and 14;

A delay unit 15 (consisting of a delay line) which delays by $h$ (generally adjustable) the signal $X(t)$ travelling through channel 14 and therefore supplies $X(t-h)$ through channel 14*a*;

Two quantization units 16 and 17 (described hereinafter in a more detailed fashion with reference to FIG. 6) respectively for signal $X(t)$ arriving through 13*b* and signal $X(t-h)$ arriving through 14*b*, these units delivering to conductors 18 and 19, respectively, the discrete (quantized) values $\hat{X}(t)$;

A unit 20 capable of supplying thresholds or quantization limits, this unit 20 comprising a series of identical resistors 20*a*, 20*b*, 20*c*, 20*d*, 20*e*, 20*f* (to simplify FIG. 5, only six resistors have been shown) this series being fed across its ends 23, 23*a* with a voltage 24 proportional to the root mean square deviation $s$ of $X(t)$ (obtained as hereinafter stated) and having its middle point 22 grounded; the thresholds supplied by conductors 26 are proportional to voltage 24, therefore to $s$;

A system capable of deducing from $X(t)$ a voltage 24 proportional to the root mean square deviation $s$ of this signal; in the case of a signal $X(t)$ complying with the Laplace law, this system may consist of a linear detector formed by a bridge of diodes 30 followed by a low-pass filter 31, bridge 30 rectifying the output of the secondary of a transformer 22 the primary of which is fed with an adjustable portion (adjustable by means of the slider 33*a* of a potentiometer 33 fed by $X(t)$ at its terminals) of signal $X(t)$, this transformer and potentiometer arrangement making it possible, on the one hand, to make the feed of the diode bridge 30 symmetrical, which maintains the centering of the signals after quantization, and, on the other hand, to adjust the width of the bands by giving the proper value to ratio $v$; such a linear detection and filtering arrangement delivers, as above indicated, a voltage 24 proportional to $s$ in the case of a centered laplacian signal;

A multiplication matrix 27 (described in detailed fashion hereinafter with reference to FIGS. 6 and 7) for performing the multiplication of quantized values $$\frac{\hat{X}(t).\hat{X}(t-h)}{s^2}$$

An integration unit 28 consisting (as described in a more detailed fashion hereinafter with reference to FIG. 6) of a low-pass filter, this unit 28 integrating the successive products $$\frac{\hat{X}(t).\hat{X}(t-h)}{s^2}\cdot dt$$

for delivering at its output 29, the correlation function $$\hat{r}(h)=\frac{\hat{C}}{s^2}$$

(it has been noted that $s^2$ appears as a denominator; this is due to the fact that the quantization units 16 and 17 compare the amplitude of the signal to be quantized not with fixed thresholds as in the prior art, but with thresholds proportional to $s$, their output being therefore not $\hat{X}(t).\hat{X}(t-h)$ but $\hat{Z}(t)$ and $\hat{Z}(t-h)$ with $Z$ equal to $X/s$);

An amplifier 34 (which as a matter of fact may be disposed either before integration unit 28 or after it, as shown) the gain of which is proportional to $s^2$, this amplifier receiving $\hat{r}(h)$ from 28 and delivering $\hat{C}=s^2.r(h)$, little different from $C(h)$, the correlation function;

Means for deducing from signal $X(t)$ a control signal for amplifier 34, proportional to $s^2$, said means comprising a diode rectifier 35 and a filter 36 which perform a quadratic detection of signal $X(t)$ (such a detection is defined and analyzed, from the mathematical point of view in pages 542 to 562, in particular in page 552, of the work of Blanc-Lapierre and Fortet entitled "Théorie des Fonction Aléatoires," i.e. "Theory of Random Functions" published by Masson and Co., Paris, 1953).

Figure 5:
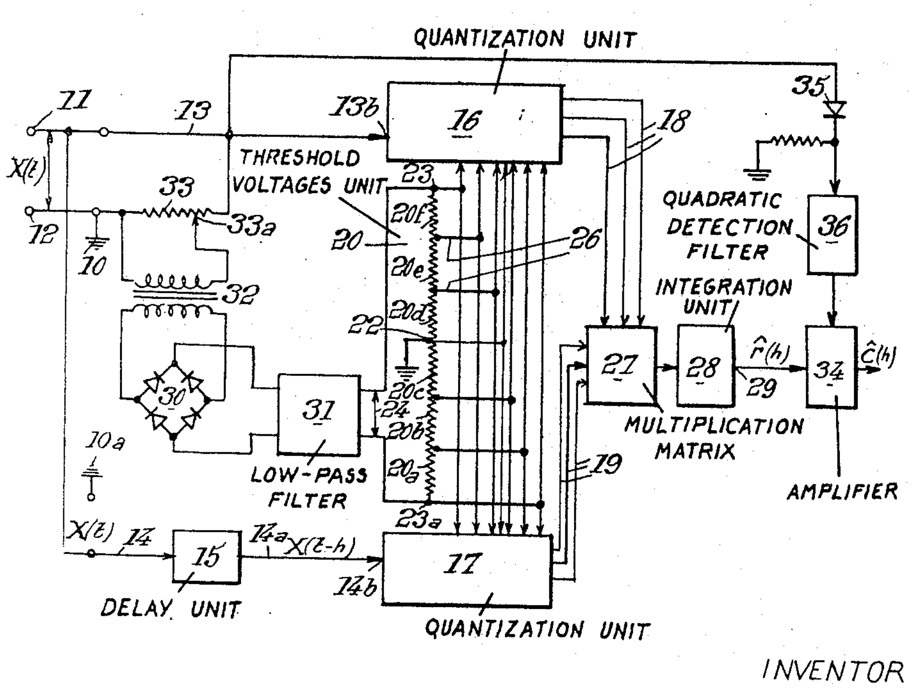
FIG. 5 shows, in the form of blocks, a device for automatically calculating correlation functions made according to the present invention.

Consequently the whole of the device of FIG. 5 performs the following operation:

unit 15 deduces $X(t-h)$ from $X(t)$, system 30, 31, 32, 33 deduces, from $X(t)$, a voltage proportional to $s$, the proportionality coefficient being adjustable by means of slider 33*a*, unit 20 deduces, from said voltage, threshold voltages proportional to $s$ for quantization bands of same width proportional to $s$, unit 16 delivers $\hat{Z}(t)$, with $$Z=\frac{X(t)}{s}$$

in a likewise manner unit 17 delivers $\hat{Z}(t-h)$, unit 27 performs the multiplication $\hat{Z}(t).\hat{Z}(t-h)$, unit 28 integrates $\hat{Z}(t).\hat{Z}(t-h)dt$ so as to give $\hat{r}(h)$, system 35, 36 deduces, from $X(t)$, a control signal proportional to $s^2$, amplifier 34 multiplies $\hat{r}(t)$ by $s^2$ and therefore delivers $\hat{C}(h)$, which represents $C(t)$ with an excellent approximation.

The embodiment of FIG. 5 is concerned with the calculation of the auto-correlation function of a single laplacian signal $X(t)$ applied across terminals 11 and 12.

In order to obtain a correlator intended to calculate the cross-correlation function between two signals $X(t)$ and $Y(t)$, it suffices to modify the inputs of the diagram of FIG. 5 by applying $X(t)$ across the terminals 11 and 12 of unit 16 and $Y(t)$ between terminal 10*a* and a terminal without reference numeral on channel 14 at the input of delay unit 15, which will then deliver $Y(t-h)$ toward unit 17; furthermore when the two signals $X(t)$ and $Y(t)$ have two different variances $s_x$ and $s_y$, respectively, the thresholds supplying units 16 and 17 will be different (the first ones will be proportional to $s_x$ and the second ones proproportional to $s_y$), whereas amplifier 34 will be again proportional to $s_x s_y$.

A possible embodiment of quantization units 16 and 17 will now be described with reference to FIG. 6 (being applied to the most general case where two functions $X(t)$ and $Y(t-h)$ are treated, Y being possibly in particular equal to X).

Every quantization unit comprises an input terminal 13*b*, 14*b* respectively, receiving the signal to be quantized $X(t)$, $Y(t)$, respectively, a series of *m* output terminals 41*a*, 41*b*, 41*c*, 41*d*, 41*e*, 41*f* for one and 42*a*, 42*b*, 42*c*, 42*d*, 42*e*, 42*f*, for the other. It comprises:

*m* Comparators 43*a*, 43*b*, 43*c*, 43*d*, 43*e*, 43*f*, for one and 44*a*, 44*b*, 44*c*, 44*d*, 44*e*, 44*f*, for the other. Each comparator—consisting for instance of a Schmitt trigger circuit (or bistable multivibrator with two cathode coupled triodes or two emitter coupled transistors)—having a first input 45, 46 connected to the input terminal 13*b*, 14*b* and a second input connected to one of the input conductors 26*a* to 26*f*: every trigger circuit is in the first state or condition as long as the potential on its first input 45, 46 (proportional to $X(t)$ or $Y(t-h)$ is lower than the potential on its second input 47, 48 (proportional to the threshold of the corresponding quantization band), but switches to its second state or condition as soon as the potential on its first input is higher than the potential of the threshold on its second input, then supplying a negative voltage at its output 73, 74; and $(m-1)$ Anti-coincidence circuits ("EXCLUSIVE OR" circuits) 49, 50, such a circuit receiving on its inputs 51, 52 or 53, 54 the outputs of two successive comparators 43 or 44 respectively and delivering a voltage on its output 55 or 56, connected to a conductor 41*a* to 41*e* or 42*a* to 42*e*, when only one of its inputs is supplied with current.

The operation of the quantization units, for instance that of unit 16 is as follows, supposing that $X(t)$ ranges between the thresholds supplied by conductors 26*e* and 26*f*. Comparators 43*a* to 43*e* have their first input 45 at a potential higher than that applied to the second input 47. They are therefore in their second condition and thus supply, through their output 73, current to the inputs 51 and 52 of the anti-coincidence circuits 49*a*, 49*b*, 49*c*, 49*d* and only to the input 52 of the anti-coincidence circuit 49*e*. On the contrary, comparator 43*f* has its first input at a potential lower than that applied to its second input 47 and it therefore remains in its first condition, where it does not feed current, through its output 73, to the input 51 of circuit 49*e*. Thus circuits 49*a*, 49*b*, 49*c*, 49*d* have both of their inputs 51 and 52 fed with negative voltages and do not supply current (for they are made of anti-coincidence i.e. EXCLUSIVE OR circuits) whereas circuit 49*e* has only one of its inputs (to wit 52) fed with current. It therefore supplies current through conductor 41*e*. In a general manner, as $X(t)$ increases, the bistable multivibrators or Schmitt trigger circuits 43*a*, 43*b*, 43*c*, 43*d*, 43*e* switch into their second condition and on every switching cause the anti-coincidence circuits 49*a*, 49*b*, 49*c*, 49*d*, 49*e* to supply current, successively. Finally, when trigger circuit 43*f* switches into its second condition, it feeds current directly to conductor 41*f* without any anti-coincidence circuit feeding current. Thus the feed of current to each of the output conductors 41*a* to 41*f* corresponds to a horizontal band of the system of FIG. 3. The same applies to the feed of each of the output conductors 42*a* to 42*f*.

The multiplication unit 27 will now be described with reference to FIGS. 6 and 7. It is constituted by a matrix, the *m* columns of which consist of the output conductors 41*a* to 42*f* of the quantization unit 16 and the *m* rows of which consist of the output conductors 42*a* to 42*f* of the quantization unit 17. To every intersection of a row and of a column there is connected, through conductors 57, 58, an "AND circuit" of the type illustrated by FIG. 7, which corresponds to each of the circles 59 of FIG. 6. Such a circuit comprises two diodes 60 and 61 disposed between a conductor 41 or 42 respectively and an output line 62 which is connected on the other hand to a source of negative voltage 83 through a resistor 84. The "AND circuit" 59 supplies current through its output 62 only when both of its inputs 57 and 58 are simultaneously fed with current.

The operation of the arrangement of FIG. 7 and therefore of matrix 27 is as follows:

The absence of signal on the output 55 or 56 of an anti-coincidence circuit 49 or 50 maintain at zero potential the corresponding conductor of column 41 or row 42. The output lines 62 to which lead one or two conductors 41, 42 at a potential equal to zero also remain at this zero potential. On the contrary, ever ytime, a line 62, and only one, is connected, through two diodes 60, 61, to a conductor 41 and a conductor 42 both brought at a negative potential, these conductors being those which correspond to the circuit 49 and the circuit 50 which deliver current. This single line 62 is then brought to a negative potential. If it is supposed that conductors 41*a* to 41*f* on the one hand and 41*a* to 42*f* on the other hand correspond respectively to the quantized values *a*, *b*, *c*, *d*, *e*, *f*, the $m^2$ output lines 62 correspond to the $m^2$ logical products *ab*, *ac*, . . . , *af*, *ba*, *bb*, . . . *bf*, *ca*, . . . , *cf*, . . ., *fa*, . . . , *ff*. Among these $m^2$ logical products the non diagonal or "rectangular" terms of the matrix are equal two by two due to the fact that $ab=ba$, $ac=ca$, etc. This is why the pairs of output lines 62*n* transmitting the same logical product are connected through "OR circuits" 63. On the contrary the output lines 62*m* of the first diagonal (corresponding to the square products *aa*, *bb*, . . . , *ff*) do not supply currents in the "OR circuits." Finally there will be a smaller number (smaller than $m^2$) of lines 62*m* and 62*p* (the latter being the output lines of the "OR circuits" 63) which transmit all the possible logical products of quantized discrete values, a line 62*m* or 62*p*, and a single one, being fed with current, to wit that corresponding to the logical products of the actual discrete value of $X(t)$ conveyed through one of the conductors 41 and of the actual discrete value of $Y(t-h)$ conveyed through one of the conductors 42. It will be noted that, in addition to the pairs of identical products such as *ab* and *ba*, some other products may, for some particular quantizations, assume the same value. Therefore, according to the discrete values that are chosen for quantizing, the correlator may include "OR circuits" having more than two inputs.

The amplitude multiplication matrix may be preceded or followed in some embodiments by a two rows and two columns matrix (for both polarities) ensuring multiplication of the signs or polarities of the signals.

Thus on one of the conductors 62*m* and 62*p* there is one signal (negative voltage) which represents a logical products of the quantized values. An amplitude proportional to this product is to be deduced from this signal.

For this purpose, every line 62*m*, 62*p* is connected to the base of a transistor 64 the collector of which is connected (possibly through a resistor common to the different transistors 64) to the negative terminal of a direct voltage source 65. The emitters of transistors 64 are connected in parallel, on the one hand to the ground through a resistor 66 having the same resistance for the different emitters, and on the other hand to an output terminal 67 through a resistor 68*a*, 68*b*, etc. the resistance of which is inversely proportional to the logical product to which corresponds the line 62*p* or 62*m* which is connected to the corresponding transistor.

Thus the transistors 64, which correspond to a line 62*p* or 62*m* which is not fed with current (that is to say which is at zero potential), do not transmit current to point 67. On the contrary a single transistor 64, which is associated with a line 62*p* or 62*m* fed with current (that is to say brought to a negative potential), supplies at 67 a current inversely proportional to the resistance of resistor 68 that corresponds thereto, therefore proportional to the corresponding logical product. Conductor 69 therefore delivers a current which, at every time, is proportional to the logical product $$\frac{\hat{X}(t)\cdot\hat{Y}(t-h)}{s^2}$$

This current passes through the common resistor 70 before being integrated in a low-pass filter 28 of the Pi type comprising a resistor 71 in series and capacitors 72 in shunt. There is thus obtained, at the output 29 of this filter $$\int_0^t \frac{\hat{X}(t)\cdot\hat{Y}(t-h)dt}{s^2}, \text{ that is to say } \hat{r}(t)$$

According to the problems that are to be solved, a different number of quantization bands will be used. For instance:

(a) in order to perform a relatively accurate measurement of the correlation function, it may be sufficient to take $s/q$ close to 1. Then, the whole of the possible values of the signal being practically limited to $\pm 4s$, choice will be made of non centered quantization distributed over four bands and their symmetrics with respect to the origin, multiplication being effected by means of a matrix having 4 columns and 4 rows for the amplitudes, before or behind which is provided a matrix having two columns and two rows for the polarities;

(b) in order to perform a rough measurement of correlation functions and in particular to obtain a very accurate system of detection by correlation, it may be sufficient to make use of a centered quantization comprising as a whole three bands. The quantized signal may then have three possible values:

O, $+q$, and $-q$ ($q$ being proportional to $s$), and the multiplication is effected with a limited amount of components, while supplying results very close to those that would be supplied by a complete analog correlation;

(c) finally, in order to perform only detections, and if a great accurancy of form is not required, quantization may be reduced to a single band on either side of zero, that is to say to a correlation by polarity coincidence. The use of an amplifier A responsive to $s^2$ will permit of considerably reducing the alteration of directivity pertaining to the method of coincidence by polarity, because there will be obtained a magnitude $s^2$ arc sin $r(h)$ which is a suitable approximation of the correlation function $C(h)=s^2r(h)$.

Whereas there has been described an analog embodiment, without sampling in time, of a correlator according to the invention, it should be well understood that the invention also applies to analog correlators with sampling and also to correlators of the numerical type with sampling. In this last case the correlator comprises, in combination, means for determining at different times the quantized discrete values of X(t) and $Y(t-h)$ which values are conveyed through the lines, such as 41 and 42, of multiplication matrices, to wit one for the absolute values and the other for the signs (the latter having two rows, respectively for sign + and sign −, and two columns for sign + and sign − and two outputs for these two signs, respectively), means for producting a number of positive and negative pulses corresponding to the actual positive or negative logical product and a counter working in both directions so as to add up the positive pulses and to subtract the negative pulses. Multiplication by $s^2$, instead of being obtained in this case by means of an amplifier having a gain proportional to $s^2$, is ensured by making the rate of sampling dependent upon $s^2$.

Finally it will be noted that the improvements according to the present application may be used in combination with those brought by the patent application Serial No. 298,378 filed by same Applicant and at the same date (July 29, 1963) for Improvements in Methods and Devices for the Automatic Calculation of Correlation Functions. In this case the quantization bands will have a width increasing, preferably according to a geometrical progression, with the absolute values of the signals to be treated, at least above a given absolute value of these signals. Resistors 20 (FIG. 5) will no longer be equal but will have resistances increasing starting from the middle point 22, which is grounded, at least starting from a given distance to this middle point.

The device according to the present invention has in particular the following advantages:

It allows to calculate correlation functions with a very good approximation while using a small number of quantization bands even when dealing with non stationary signals, which simplifies the construction and operation of the correlator.

The quantization units and chiefly the multiplication units are simplified and thus the operation of the correlator is very safe.

Finally a correlator according to the present invention has a very wide range of utilization.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

It is possible for instance, to have the quantization in units 16 and 17 preceded by a preamplification with automatic gain control, such that the root mean square deviation of the amplified signal will be independent of that of the input signal. In this case the thresholds of the quantization unit will be of constant value (but the thresholds of the quantization operation will be, in fact, proportional to $s$ because the signal will have been amplified with a gain proportional to $1/s$) and the output amplifier 34 will be controlled by the regulating voltage supplied by the preamplifier.

What I claim is:

1. A device for the automatic calculation of a correlation function of a first and a second signal which comprises, in combination, a system for determining quantization thresholds, this system being capable of supplying voltages of respective levels proportional to the root mean square deviation of the first and second signal at least within a wide range of the values of said root mean square deviation; two quantization units, a first one for quantizing the first signal and a second one for quantizing the second signal, by comparison with the voltages supplied by said system, each of said quantization units comprising a small number of output conductors only one of which is fed at every time and each of which corresponds to a discrete quantization value; a logical multiplication unit comprising at least one matrix the columns of which consist of the output conductors of the first quantization unit and the rows of which consist of the output conductors of the second quantization unit, said multiplication unit comprising a small number of output lines only one of which is fed with current at any time and each of which corresponds to one of the values of the logical product of the first and second signal; means for deducing from the feed of each of said output lines a quantity proportional to the value of the logical product; means for integrating said quantity; and an amplifier connected at the output of said integrating means, said amplifier having a gain proportional to the product of the root mean square deviations of the first and second signal.

2. A device according to claim 1 wherein said system for determining quantization thresholds comprises a linear detector fed with the first and second signal and a series of resistors the two ends of which are connected with the output of said detector.

References Cited

UNITED STATES PATENTS

| | | | |
|---|---|---|---|
| 2,715,678 | 8/1955 | Barney. | |
| 3,104,370 | 9/1963 | Rabinow | 340—146.3 |
| 3,221,159 | 11/1965 | Cook et al. | 235—181 |
| 3,235,717 | 2/1966 | Martens | 235—164 |

MALCOLM A. MORRISON, *Primary Examiner.*

I. KESCHNER, *Assistant Examiner.*